United States Patent
Ayres

[11] 3,913,784
[45] Oct. 21, 1975

[54] SEALING CLOSURE APPARATUS
[76] Inventor: David B. Ayres, 4633 W. M-12, Quartz Hill, Calif. 93534
[22] Filed: May 15, 1974
[21] Appl. No.: 470,253

Related U.S. Application Data
[63] Continuation of Ser. No. 291,449, Sept. 22, 1972, abandoned.

[52] U.S. Cl. .............. 220/348; 220/86 R; 220/361
[51] Int. Cl.² .......................................... B65D 43/20
[58] Field of Search ........... 220/86, 85 F, 281, 345, 220/348, 361

[56] References Cited
UNITED STATES PATENTS
1,433,912  10/1922  Rosenlof ............................. 220/35
2,411,505  11/1946  Chamberlain et al. ............... 220/86

*Primary Examiner*—William I. Price
*Assistant Examiner*—Steven M. Pollard
*Attorney, Agent, or Firm*—Nilsson, Robbins, Bissell, Dalgarn & Berliner

[57] ABSTRACT

An apparatus is disclosed embodied as a sealing closure structure for a refilling port in a fuel tank. A closure member is supported and guided by an elongated mounting mechanism for aligned motion in relation to the port. A plurality of pairs of pivotally-connected arms are affixed to be urged by a spring means and exert a force on the closure member, the effective component of which varies to compensate the changing spring force. The structure affords an improved spring-closure mechanism to provide a force between any of a variety of relatively-movable members.

10 Claims, 7 Drawing Figures

U.S. Patent    Oct. 21, 1975    3,913,784
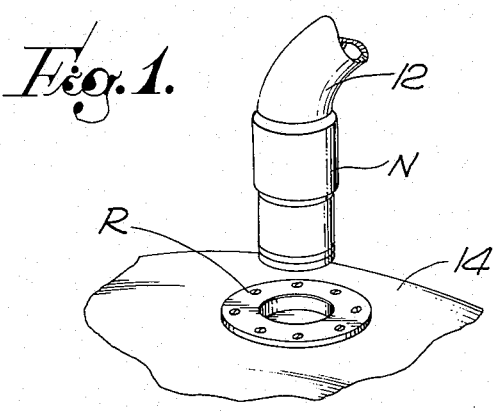
Fig.1.
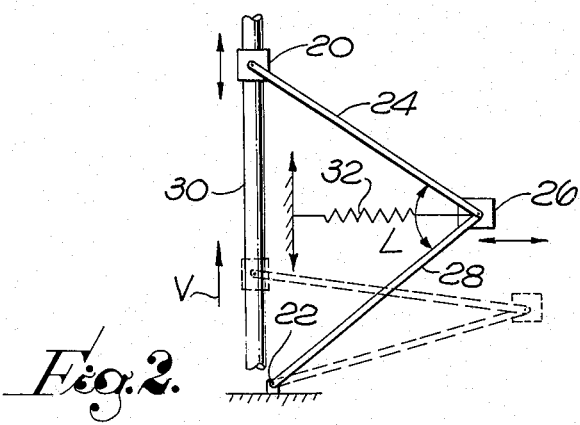
Fig.2.
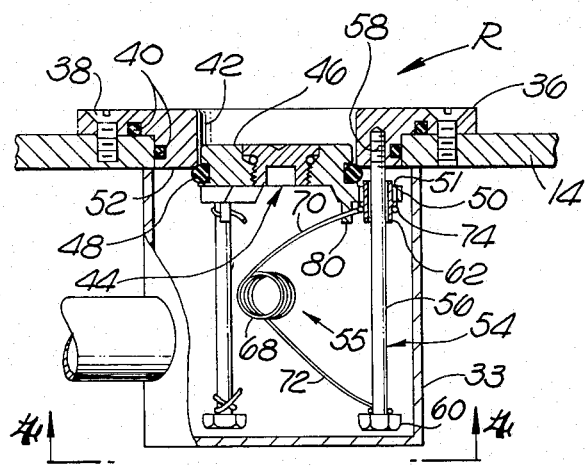
Fig.3.
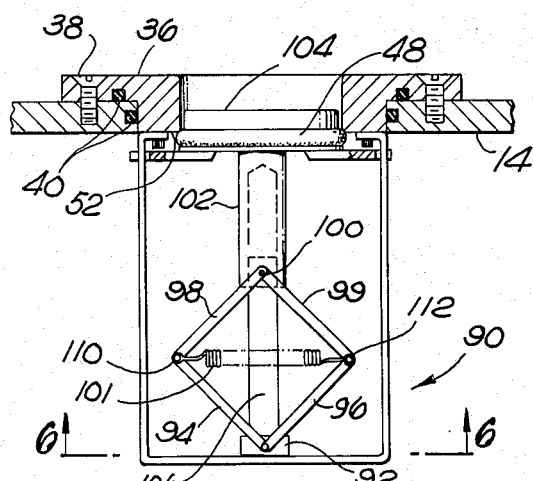
Fig.5.
Fig.3a.
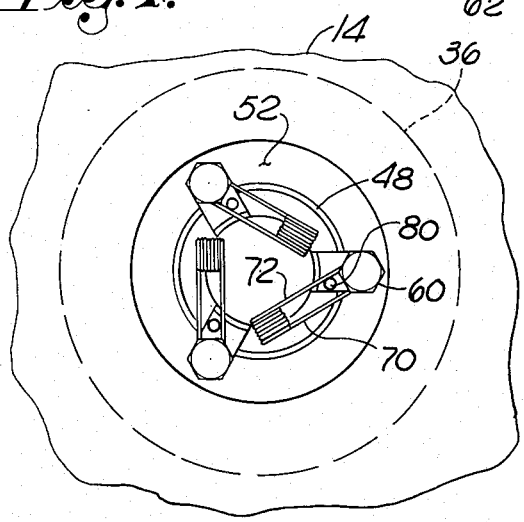
Fig.4.
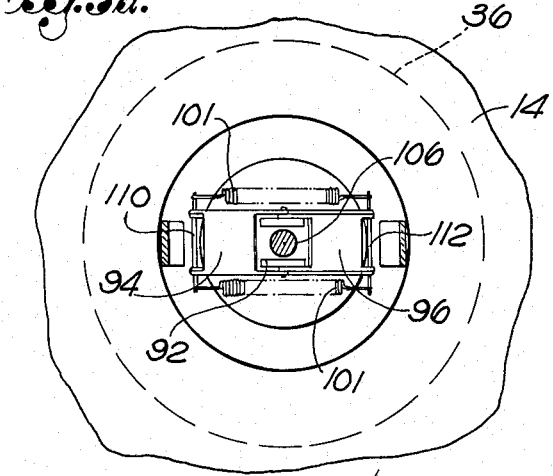
Fig.6.

SEALING CLOSURE APPARATUS

This is a continuation of application Ser. No. 291,449, filed Sept. 22, 1972 and now abandoned.

BACKGROUND AND SUMMARY OF THE INVENTION

A problem of considerable current concern relates to avoiding the presence of substantial hydrocarbons in the atmosphere. At the present time, it is widespread practice to transfer hydrocarbon fuels through hoses and ducts that have open couplings. For example, vehicles (including boats, airplanes and automobiles) are conventionally refueled by simply inserting a nozzle into a tank orifice and passing fuel through that connection which is open to the atmosphere. As a consequence, gases that are vented from tanks during refueling operations carry large quantities of hydrocarbons into the air, with resulting contamination of the atmosphere.

Generally, the above problem has been recognized to some extent, however, concurrent with such recognition has been the appreciation of the need for practical structures to accommodate closed-passage refueling operations. That is, a need exists for a practical, simple, and inexpensive coupling that can be rapidly connected to provide a closed fluid passage, as for example between a fuel hose and a fuel tank. As an element of such a coupling, a need exists for a receptacle structure (embodied for example in a fuel tank) which is normally closed and which may be conveniently and easily joined with a nozzle for example that is attached to a fuel hose. Generally, it is desirable that the receptacle structure automatically close upon withdrawal of the nozzle. It is also important that the unit be compact, light, economical, durable and simple to use.

Within the purview of the above considerations, the present invention relates to an improved structure for exerting a closing force, as for example between an orifice and a closure member. The structure utilizes a pivotal-arm, spring-driven arrangement for applying the force and enables several advantages as considered in detail below.

BRIEF DESCRIPTION OF THE DRAWING

In the drawing, which constitutes a part of this specification, an examplary embodiment exhibiting various objectives and features hereof is set forth, specifically:

FIG. 1 is a perspective view illustrative of a structure in accordance herewith;

FIG. 2 is a diagrammatic representation illustrative of the operation of a structure constructed in accordance herewith;

FIGS. 3 and 3A are sectional views taken through a portion of the structure illustrated in FIG. 1;

FIG. 4 is a bottom view of the structure depicted in FIG. 3;

FIG. 5 is a view similar to that of FIG. 3 illustrating an alternate form of structure; and FIG. 6 is a bottom view of the structure of FIG. 5.

DESCRIPTION OF THE ILLUSTRATIVE EMBODIMENTS

As required, detailed illustrative embodiments of the invention are disclosed herein. The embodiments exemplify the invention which may, of course, be embodied in other forms, some of which may be radically different from the illustrative embodiments. However, the specific structural and functional details disclosed herein are representative, and they provide a basis for the claims herein which define the scope of the invention.

Referring now to FIG. 1, there is shown a nozzle N positioned somewhat aligned with a receptacle R, preparatory to mating engagement. The nozzle N is connected to a hose 12 while the receptacle R is affixed in a tank 14 (fragmentarily represented). In different applications, the nozzle N and the receptacle R may be variously utilized; however, as depicted in FIG. 1, the nozzle N is deemed to be connected through a hose 12 to a source (not shown) of fluid, e.g. hydrocarbon fuel, while the tank 14 may be a vehicular fuel tank.

In the operation of the structure hereof, a coupling between the nozzle N and the receptacle R is accomplished simply by forcing the nozzle into the receptacle, requiring no turning or twisting. The fact that the nozzle need not be turned, twisted or otherwise actuated is an important consideration as is the fact that when the nozzle N is engaged with the receptacle R, a closed coupling is provided. Accordingly, in the system of the illustrative embodiment, as fuel passes through the hose 12 and the nozzle N into the tank 14, hydrocarbon fumes are not dispensed into the atmosphere.

The nozzle N may take various forms of specific structures, for example as disclosed in U.S. Pat. application Ser. No. 175,301 now U.S. Pat. No. 3,746,043 entitled "Fluid Connection Apparatus Incorporating Control Valve" and filed by the present inventor. The form of the receptacle R, and the actuating mechanism for closing the receptacle R comprise the present invention. More specifically, the present invention as disclosed herein is embodied in a yielding closure structure for maintaining the receptacle R closed at all times when the nozzle N is not received. Generally, preliminary to considering the detailed structure of the receptacle R, reference will be made to FIG. 2 with an explanation of the fundamental mechanical principles involved herein.

Generally, as depicted in FIG. 2, the mechanism serves to provide a spring force opposingly applied between a movable member 20 and stationary member 22. As embodied in the receptacle R (FIG. 1) the movable member 20 constitutes a sealing closure member while the stationary member 22 is integral with the tank 14.

The movable member 20 is pivotally connected to an upper arm 24 which is in turn connected by a pivot structure 26 to a lower arm 28, the lower end of which is connected to the fixed member 22. The member 20 is guided by sliding engagement with an elongate rod 30 which limits motion between the members 20 and 22 to reciprocating movement in a single directional pattern.

The pivot structure 26 also is connected to one end of a spring 32, the opposed end of which is anchored. As depicted, the spring 32 urges the pivot structure 26 to the left, thereby tending to raise the member 20 on the rod 30, moving it away from the member 22. However, as the spring 32 is yieldable, the member 20 can be forced to a position that is close to the member 22, as illustrated by the components shown in phantom.

Several advantages exist for the mechanism as illustrated in FIG. 2. For example, it is apparent that the spring 32 does not obstruct or otherwise interfere with the movement pattern of the member 20. As a consequence, the member 20 may move through a full motion stroke unrestricted by any spring whhich might otherwise be positioned on the rod 30. Also, motion of the member 20 over the full length of the stroke tends to involve a more-uniform force pattern. In that regard, it may be seen that as the member 20 moves toward the member 22, the spring 32 is progressively elongated with the result that it exerts a greater resisting force on the structure 26. However, as a compensating consideration, as the member 20 moves downwardly, an increased force component (or vector) is exerted tending to elongate the spring 32. As a consequence, the two variations tend to be compensating with the result that a motion pattern may involve an extended distance involving a more uniform force distribution. Considering FIG. 2, somewhat as a force diagram, it may be seen that the force applied between the members 20 and 22 remains somewhat constant with position, as a result of the compensating changes in the spring 32 and the force vectors acting through the angle L. For example (using representative figures), if the angle L is 90°, and the spring force is 10 pounds, the force vector V may approximate 5 pounds. Pursuing the example, if the angle L is increased, e.g., to 135°, the travelling spring 32 is shortened in length and consequently exerts a reduced force, e.g., 7 pounds. However, the increase in angle between the members 20 and 22 compensates that change in spring force, with the result that the force vector V may continue to approximate 5 pounds. Similarly, in the phantom representation, reducing the angle L elongates the spring 32 (to provide a greater spring force) however, the reduced force component (acting through the members 20 and 22 at the angle L) compensates the change. Thus, the mechanical lever in a spring-force application system enables a controlled force vector V by varying by angle L and the associated length of the spring 32.

In view of the above preliminary consideration of the structure of FIG. 2, reference will now be made to FIG. 3 showing a sectional view through a passage into the receptacle R (FIG. 1). Note that an enclosure 33 is affixed on the underside of the wall 14. Generally, the enclosure 33 may typify various structures; however, as provided herein, it serves merely to illustrate the ability of the present structure to attain a fully-opened position in a somewhat confined space. Such elements are useful, for example, in venting arrangements. More specifically, the receptacle R includes a flange ring 36 affixed to the tank 14 by screws 38 and O-ring seals 40. The flange ring 36 defines a central orifice 42 through which the nozzle structure N (FIG. 1) is received in sealing engagement. In the closed state of the receptacle R (FIG. 3) the orifice 42 receives a sealing valve head or closure member 44 which includes a flat disk section 46 defining a peripheral groove containing an O-ring 48. The member 44 incorporates a concentric plug 45 (as for inspection) and also includes radial guide tabs 50 (FIG. 3a) which are part of the mechanism for guiding the closure member 44 so that the O-ring 48 sealingly engages the surface 52.

The radial guide tabs 50 each receive one of the axially parallel studs 54 which are similar and all of which are threadably received in the flange ring 36 through the surface 52. The studs 54 include an elongated shaft 56 terminated at one end by a threaded section 58 (received in the ring 36) and at the other end by a hexagonal head 60.

Each of the studs 54 carries a bushing 62 for sliding motion on its elongated shaft 56. Each bushing 62 snugly receives the shaft 56 and is loosely coupled to the associated tab 50. The enlarged bores 51 in the tabs 50 permit the closure member 44 to experience substantial angular offset from the horizontal (as depicted) without the member 44 binding on the studs 54. Accordingly, the member 44 is guided for smooth movement into and away from the orifice 42 even though it becomes horizontally misaligned. Also, by controlling the distance between a flange 63 (on the bushing 62) and a snap ring 65, the extent of angular offset may be controlled, while permitting the bore in the tab 50 to be of increased diameter so as to obtain self-centering alignment between the section 46 and the orifice 42.

Each of the studs 54 supports a spring structure 55 (FIG. 4) including a coil spring 68, the ends of which define extending arms 70 and 72 (FIG. 3) that terminate in loops 74 and 76, respectively. With regard to each of the structures 55, the loop 74 concentrically receives the bushing 62 while the loop 76 encircles the shaft 56 abutting the head 60. The spring 68 is stressed so that the arms 70 and 72 exert separating forces with the result that the bushing 62 on each of the studs 54 receives a force urging the closure member 44 into a closed position with the flange ring 36.

In the operation of the unit as depicted in FIG. 3, if the closure member 44 is forced to an open position (downwardly as illustrated) each spring 68 is yieldingly stressed and presents an increasing spring force. However, that increase in force is compensated by the fact that as the arms 70 and 72 become more nearly parallel, the effective force component that is exerted on the spring 68 increases. It may, therefore, be seen that the force pattern required to displace the member 44 over a length of travel is of a more linear nature and represents a substantial advantage in many applications.

As another consideration in relation to the structure of FIG. 3, it is to be noted that the member 44 is afforded a relatively long stroke. That is, in various prior springmounted structures, a length of compressed spring conventionally limits the stroke length. It is also to be noted, in the structure of FIG. 3, that each of the studs 54 has associated therewith a short pin 80 extending downwardly from the flange 50 beyond the arm 70. As a consequence, the springs 68 are locked in an axially central location between the studs 54.

Of course, a mechanism in accordance herewith may be variously embodied and in that regard an alternate embodiment using coil springs 101 as depicted in FIGS. 5 and 6. Generally, the structure of the flange ring 36 is similar to that previously described and is designated by similar reference numerals. Affixed to the surface 52 of the flange ring is a U-shaped yoke 90, which supports a pivot block 92 at a lower central location. The pivot block 92 receives one end of each of the arms 94 and 96, the other ends of which are pivotally connected to arms 98 and 99 to define a rectangular pivotal polygon. The junction 100 between the arms 98 and 99 is connected to a tubular shaft 102 extending concentrically from the closure disk 104. The shaft 102 telescopically receives a guide shaft 106 which is affixed to the yoke 90 to extend in concentric alignment with the shaft 102.

In the operation of the mechanism, the coil springs 101 exert a force tending to draw the junction points 110 and 112 together (between the arms 94 and 98 and arms 96 and 99, respectively). Consequently, the junction 100 is urged upwardly with the result that the closure disk 104 is seated in closed relationship with the flanged ring 36. Upon application of a sufficient external force to the closure disk 104, the junction point 100 is moved downwardly; which motion is accommodated by the junction points 110 and 112 separating to lengthen the springs 101. In that manner, a continual spring force urges the closure disk 104 into a sealing position, however, enables forceful displacement of that member.

It is to be noted, as previously considered, that as the coil springs 101 are lengthened, they provide an everincreasing force to resist being further lengthened to accommodate further inward motion by the disk 104. However, compensatory of that increasing required force is the fact that as the pivotal junction 100 moves downwardly as depicted, an increased force component is applied to lengthen the springs 101. Accordingly, as indicated above, the structure incorporates compensating considerations. Additionally, as with regard to the previous embodiment, it is apparent that a relatively full stroke is accommodated, unhampered by lengths of compressed coil springs.

In view of the above considerations, it may be seen that an improved mechanism is provided incorporating substantial advantages over the prior art and which may be embodied in various forms. However, the scope hereof is deemed to be in accordance with the claims as set forth below.

What is claimed is:

1. A closure structure for a receptacle, as in a fluid tank, comprising:

a closure member to be received to close said receptacle;

plural pairs of first and second arms, interconnected at a pivot junction for relative pivotal motion;

means for connecting each of said first arms to said receptacle at spaced-apart locations removed from said pivot junction;

means for coupling each of said second arms to said closure member at spaced-aparat locations removed from said pivot junction;

guide means for said closure member, to limit movement thereof in relation to said first member to a single direction whereby to vary the angular relationship between said first and second arms at said pivot junction; and spring means for exerting a force directly between said pairs of arms to provide a position biasing force for moving said closure member into closing relationship with said receptacle.

2. A spring mounting structure according to claim 1 wherein one of said members defines a port and the other of said members defines a closure for said port.

3. A spring mounting structure according to claim 1 wherein said spring means is integrated between said pair of arms as a unitary structure to provide said interconnection.

4. A spring mounting structure according to claim 1 wherein said spring means comprises a coil spring affixed to said pivot junction and extending normally to said single direction of movement so as to bisect the angle between said arms.

5. An apparatus according to claim 1 wherein said spring means is affixed to bisect the angle between said pair of arms.

6. An apparatus according to claim 5 wherein said spring means comprises a coil spring affixed between pairs of said arms.

7. An apparatus according to claim 5 wherein one of said members defines a port and the other of said members defines a closure for said port.

8. A structure according to claim 1 wherein said guide means comprises an elongated rod means extending in said single direction.

9. A structure according to claim 8 wherein said guide means further includes a bushing disposed on said elongated rod means.

10. A structure according to claim 9 wherein said bushing is loosely coupled to said second member.

* * * * *